(12) United States Patent
Borodow et al.

(10) Patent No.: US 7,039,176 B2
(45) Date of Patent: May 2, 2006

(54) CALL CENTER ADMINISTRATION MANAGER WITH RULES-BASED ROUTING PRIORITIZATION

(75) Inventors: Eli Ben Borodow, La Jolla, CA (US); Ran Ezerzer, San Diego, CA (US); Edwin Kenneth Margulies, Morristown, NJ (US)

(73) Assignee: Telephony@Work, La Jolla, CA (US)

( * ) Notice: Subject to any disclaimer, the term of this patent is extended or adjusted under 35 U.S.C. 154(b) by 643 days.

(21) Appl. No.: 09/902,069

(22) Filed: Jul. 9, 2001

(65) Prior Publication Data

US 2002/0101979 A1 Aug. 1, 2002

Related U.S. Application Data

(63) Continuation-in-part of application No. 09/638,274, filed on Aug. 14, 2000, and a continuation-in-part of application No. 09/798,226, filed on Mar. 2, 2001.

(51) Int. Cl.
*H04M 3/523* (2006.01)

(52) U.S. Cl. .............................. 379/265.02; 379/265.09; 379/265.13; 379/266.02

(58) Field of Classification Search ............ 379/265.02, 379/309, 266.02, 265.13, 265.12, 265.09; 705/14
See application file for complete search history.

(56) References Cited

U.S. PATENT DOCUMENTS

| 5,479,487 | A | 12/1995 | Hammond |
|---|---|---|---|
| 5,822,306 | A | 10/1998 | Catchpole |
| 5,903,641 | A | 5/1999 | Tonisson |
| 5,982,873 | A | 11/1999 | Flockhart et al. |
| 6,046,762 | A | 4/2000 | Sonesh et al. |
| 6,163,607 | A | 12/2000 | Bogart et al. |
| 6,173,053 | B1 | 1/2001 | Bogart et al. |
| 6,230,197 | B1 | 5/2001 | Beck et al. |
| 6,233,332 | B1 * | 5/2001 | Anderson et al. ...... 379/265.09 |
| 6,263,066 | B1 | 7/2001 | Shtivelman et al. |
| 6,487,291 | B1 * | 11/2002 | Walker et al. ......... 379/266.02 |
| 6,570,980 | B1 * | 5/2003 | Baruch .................. 379/265.12 |
| 2001/0011228 | A1 * | 8/2001 | Shenkman ................... 705/14 |

* cited by examiner

*Primary Examiner*—Harry S. Hong
(74) *Attorney, Agent, or Firm*—Paul, Hastings, Janofsky & Walker LLP

(57) ABSTRACT

A multi-media call center provides an interface tool for enabling non-technical personnel of a company running the call center to provision and configure the call center from available resources. The calls received by the call center are identified and their attributes useful in queuing the calls are determined. Based on the attributes, priority ratings are computed for the calls by applying a predetermined function to the attributes, and the calls are queued in accordance with their respective priority ratings. The weights to be given to the various priority attributes and the initial values of the customer-specific priority attributes are set through the interface tool during the provisioning and configuring process. The attributes are linked to the call center's live database, and the values of the customer-specific priority attributes are dynamically updated, so that events relevant to call prioritization that occur after the initial configuration has been completed can affect call queuing.

29 Claims, 7 Drawing Sheets

| WORKGROUP ID | EMAIL ADDRESS | PHONE WORK | CUSTOMER ID | ATTRIBUTE 1 | ATTRIBUTE 2 | ATTRIBUTE 3 |
|---|---|---|---|---|---|---|
| SPRING SALE | FRANK_OZ@ | | | 18 | 2 | 9 |
| SPRING SALE | LARRY_KORCH | | | 22 | 15 | 16 |
| SPRING SALE | MARY_RICH | | | 29 | 3 | 14 |
| SPRING SALE | ED_BELL | | | 5 | 40 | 1 |
| SPRING SALE | TONY_PIZZA | | | 9 | 35 | 88 |
| SPRING SALE | GAIL_WONG | | | 10 | 71 | 92 |
| SPRING SALE | FRED_NILLY | | | 70 | 16 | 5 |
| SERVICE GOLD | | 8589930121 | | 55 | 14 | 6 |
| SERVICE GOLD | | 7039472213 | | 62 | 22 | 7 |
| SERVICE GOLD | | 9735581101 | | 90 | 27 | |

REPRESENTATION OF AN ORACLE OR SQL SERVER "VIEW" WHICH IS AUTOMATICALLY GENERATED BY THE RULES-BASED CREATOR.

FIG. 6

CALL CENTER ADMINISTRATION MANAGER WITH RULES-BASED ROUTING PRIORITIZATION

RELATED APPLICATION

This application is a continuation-in-part of copending U.S. patent application Ser. No. 09/638,274, entitled Call Center, filed on Aug. 14, 2000; and of copending U.S. patent application Ser. No. 09/798,226, entitled Call Center Administration Manager, filed Mar. 2, 2001. Each of these patent applications has been assigned to the assignee of the present application, and is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to call center provisioning, management, supervision, and to call prioritization, queuing, disposition, and routing.

2. Background

Organizations with more than trivial needs for customer interaction often use call centers to provide services to their customers and to organize sales personnel. A call center is the means by which an organization, e.g., company or "enterprise," handles customer and other calls, usually with some amount of computer automation. Typically, a call center can handle a considerable volume of inbound and outbound calls at the same time, screen inbound calls, forward them to agents (e.g., customer service representatives) with appropriate skills, and maintain records of the calls and of the call center agents. Call centers have traditionally been used by mail-order catalog companies, telemarketing companies, computer product help desks, and other similar organizations that use the telephone to sell or support their products and services.

Many call centers use computer-telephony integration (CTI), also known simply as "computer telephony," to process telephone calls. These terms refer to the use of computers in managing the calls. Since the advent of the information technology revolution, companies have increasingly felt the need to interact with their customers through alternative communication channels that include, for example, facsimile transmissions, email, and web-based contacts. The alternative channel contacts are generally susceptible to CTI-based processing at least to the same extent as conventional telephone calls, and the benefits of computer-based management apply to them as well.

Here, as in the parent patent documents, by "call" we mean any kind of customer interaction, including, without limitation, facsimile transmissions, email messages, and web-based contacts such as chats. The intended meaning of "caller" is the same as the intended meaning of "customer": it is the person or entity with whom the interaction takes place; unless specific context indicates otherwise, the caller/customer need not be the originator of the interaction.

A typical modern call center is a complicated technological amalgam of hardware and software that may reside, in whole or in part, on a telecommunications network. Provisioning such a call center for an enterprise can be a lengthy, technically involved process performed by "integrators"—technicians, engineers, and programmers highly skilled in combining computer equipment, telecommunication equipment, and software from various manufacturers. Consequently, the time and costs involved in provisioning a call center may be substantial, and the ability to minimize them may provide an important competitive advantage. It is therefore desirable to enable provisioning call centers quickly and without massive efforts of trained and highly compensated specialists.

A call center may include the capability to route a received call based on the call's attributes, such as information carried by the call, information submitted by the caller before the call is routed, and information regarding the caller stored in the call center's database or otherwise available to the call center. Similarly, the call center may include the capability to prioritize handling and disposition of the call based on these attributes. As used in this document, to prioritize means to determine or set the order for dealing with items, to establish priorities for a set of items; prioritization is the noun derivative of the verb prioritize.

Call centers are often provisioned and hosted for clients-subscribers by providers of telecommunication services, for example, long distance telephone carriers (Telcos) and application service providers (ASPs). Thus, provisioning a call center may involve discussions between the representatives of a long distance carrier and an enterprise to define, for example, functionality of the call center; its limitations; and the capabilities available to the enterprise, such as the number and skills of the enterprise's agents. The definitions tend to be made without sufficient precision, necessitating redesigns with their concomitant additional delays and costs. It would be beneficial to provide a high-level design tool for defining and provisioning a call center, and to push out the design tool's interface to a subscriber, to enable the subscriber to self-provision and administer a call center using non-technical employees, with little involvement by the service provider, such as an ASP or a Telco. It would also be beneficial for the high-level design tool to provide the ability to define call queuing priority rules based on parameters that include call attributes.

SUMMARY

The present disclosure is directed to apparatuses, methods, and articles of manufacture containing machine-readable computer program code for call center administration. Briefly, and without attempting to describe either all of the major features of the invention or to limit the description to the strictly necessary features, the call center administered is capable of receiving a plurality of calls, with each received call of the plurality of calls being associated with at least one priority attribute from a plurality of priority attributes. The call center is capable of prioritizing the received calls of the plurality of calls for servicing by a plurality of endpoints based at least in part on priority ratings of the received calls of the plurality of calls. In administering the call center, the following steps are performed:

(1) One or more input screens are provided to enable a person to input data to the call center through an interface. The data comprises:

(i) a plurality of priority attribute weights, each priority attribute weight of the plurality of priority attribute weights being associated with a different priority attribute of the plurality of priority attributes, and (ii) a plurality of priority attribute values, each priority attribute value of the plurality of priority attribute values being associated with a priority attribute of the plurality of priority attributes.

(2) Storing information in the call center, the information comprising:

(i) the inputted data, and (ii) a first predetermined function, wherein priority rating of each received call of at least a subset of the plurality of calls is calculated by applying the first predetermined function to one or more priority attribute values associated with one or more priority attributes associated with said each received call of the subset, and to priority attribute weights associated with the one or more priority attribute values associated with one or more priority attributes associated with said each received call of the subset.

BRIEF DESCRIPTION OF THE DRAWINGS

The present invention will now be explained, by way of examples only, with reference to the following description, appended claims, and accompanying Figures where:

FIG. 6 illustrates a representative Oracle or SQL server table automatically generated by the prioritization rules-based creator portion of the administration manager.

DETAILED DESCRIPTION

U.S. patent application Ser. No. 09/798,226 and U.S. patent application Ser. No. 09/638,274 describe call centers with several features. One of the features is the capability that allows provisioning configuration, and administration of a call center by non-technical employees of a company-subscriber, i.e., employees without specialized hardware or software training. This feature, referred to as self-provisioning, is made possible by a straightforward, intuitive administration manager interface that presents a call center administrator with a series of simple questions, prompts, menus, list boxes, radio buttons, and similar input means for providing information to a computer-based device.

The collection of the input means of the inventive call center administration manager in accordance with the present invention further includes a mechanism for providing a call center database with information needed for prioritizing call servicing. It should be understood, however, that the administration manager in accordance with the present invention may, but need not, operate in conjunction with the other features described in the commonly-assigned patent documents referred to above, and that the meaning of "call center" here is not limited to the call centers described in those documents.

Figure 1:
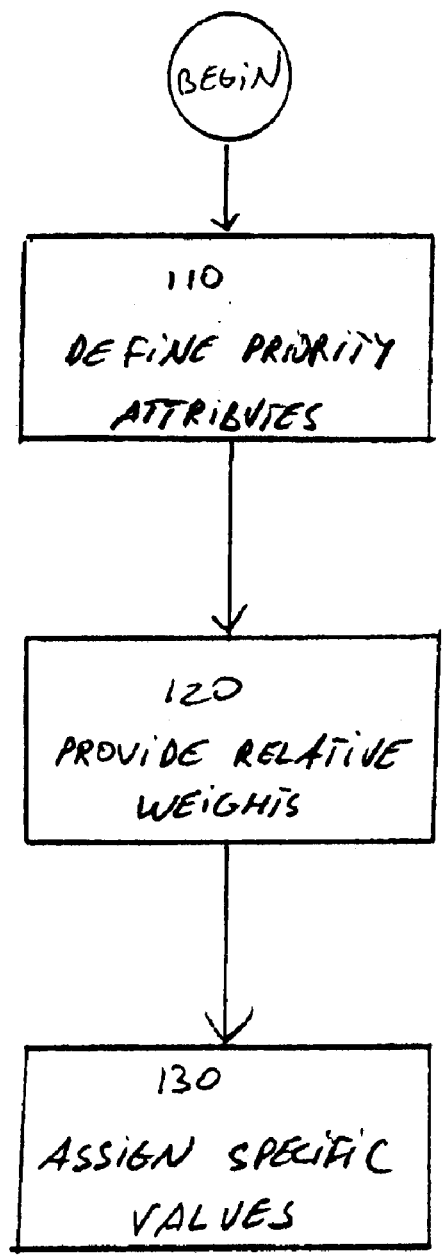
FIG. 1 illustrates a sequence of inputting customer priority attribute information into a call center to configure the call center for prioritizing and queuing calls based on customer priority attributes.

The process for inputting the information for prioritizing calls is illustrated in more detail in FIG. 1. In step 110, a call center administrator defines priority attributes relevant to prioritizing the calls, i.e., the attributes of the customer or the call used by a queuing/prioritizing algorithm. In step 120, the call center administrator provides relative weights to the call attributes defined. Next, in step 130, customer-specific values are assigned to the defined attributes.

The specific means used by the administrator to input the information in steps 110–130, as well as in other steps described throughout this document, is not critical. For example, the means may comprise a personal computer running a browser program.

The information provided to the call center administration manager in the steps 110 through 130 may be saved (1) locally, e.g., in the computer used for implementing the administration manager interface; (2) in the call center's database; or (3) elsewhere, e.g., in another database connected to the call center. The information storage may be implemented in any kind of storage medium, including, without limitation, magnetic storage, e.g., a magnetic disc or a magnetic tape; optical storage medium, e.g., a CD-ROM; or electronic semiconductor memory, e.g., Random Access Memory (RAM), flash memory, and erasable electrically programmable memory (EEPROM). The information provided may subsequently be made available to the call center or to some of the call center's components.

Figure 2:
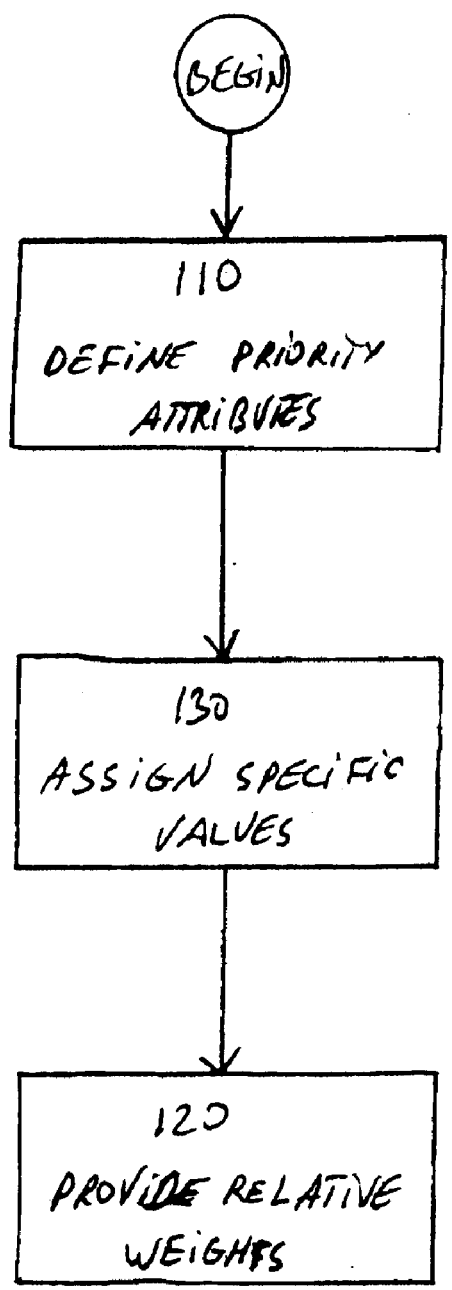
FIG. 2 illustrates another sequence of inputting customer priority attribute information into the call center to configure the call center for prioritizing and queuing calls based on customer priority attributes.

The sequence of the steps 110–130 in FIG. 1 is somewhat arbitrary. The customer-specific values can be assigned before the relative weights of the attributes are provided to the call center. This sequence is illustrated in FIG. 2. (Identical or similar numerals in the Figures denote identical or similar elements or steps.) Moreover, not all of the attributes need to be processed at the same time. Thus, one or more of the attributes can be defined, weighted, and assigned customer-specific values before one or more other attributes have been defined, weighted, or assigned customer-specific values. In fact, even the step 110 need not be completed before either the step 120 or the step 130 is performed; an attribute can be renamed after it has been weighted and customer-specific values have been assigned. And, as will be explained below, either or both process steps 120 and 130 may not have to be performed explicitly at all.

To incorporate the process of defining, weighting, and assigning values to caller attributes in the browser-based call center administration manager implementation described in U.S. patent application Ser. No. 09/798,226, two tabs have been added: (1) Customer Priority Attribute tab, and (2) Customers tab. The two tabs appear between Project Menus and Projects tabs in the left-hand column of FIG. 3, which illustrates screen output of a browser-based call center administration manager interface in accordance with the present invention.

Figure 3:
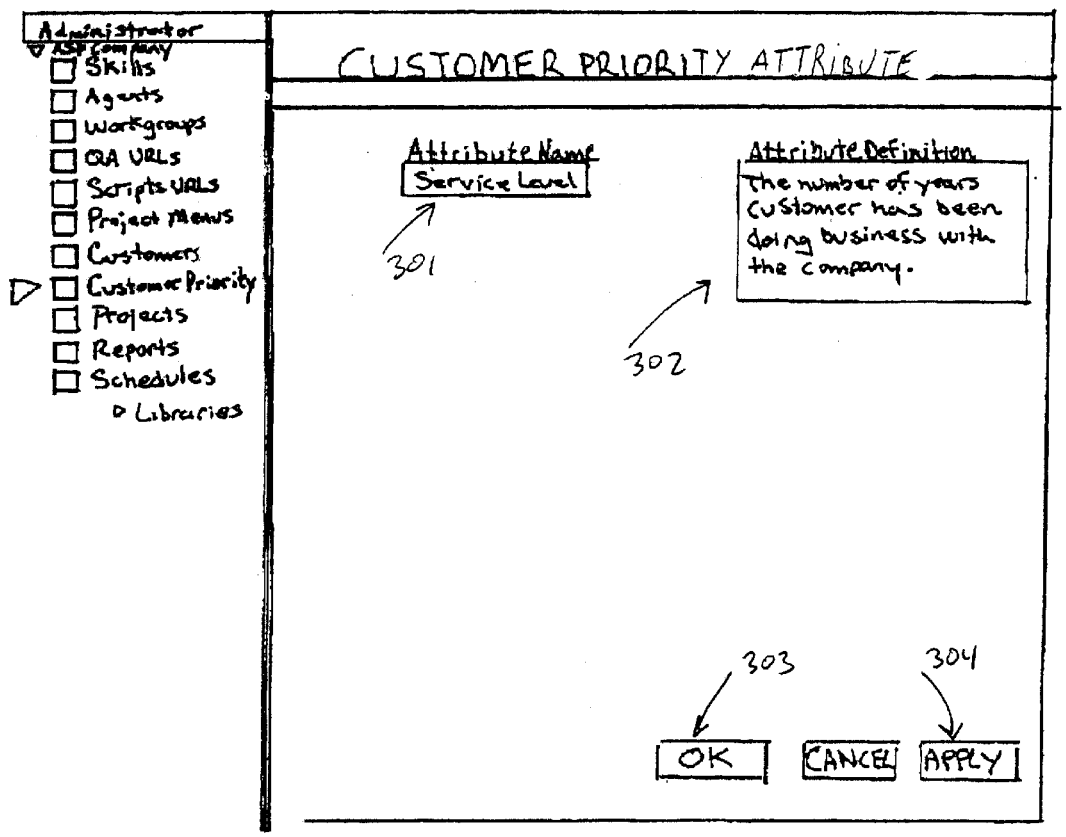
FIG. 3 illustrates representative screen output of a browser-based call center administration manager during the step of defining customer priority attributes.

The screen output of FIG. 3 corresponds to the output of the interface after the Customer Priority Attribute tab has been clicked, i.e., when process the step 110 of FIGS. 1 or 2 is being performed. This screen allows the call center administrator to define (i.e., create) a Customer Priority Attribute object, much as the screen illustrated in FIG. 8 of the application Ser. No. 09/798,226 allows the call center administrator to define a Skill object. To create a Customer Priority Attribute object, the call center administrator types the Attribute object's name in the Attribute Name box 301, and the Attribute objects description in box 302. The description is, in essence, an optional comment to help remember the reasons for having the Attribute object. The name of the Customer Priority Attribute object can be anything, but preferably will have some significance and be recognizable by the call center administrator. After the Customer Priority Attribute object has been named, the administrator can click on OK button 303 to store the definition and exit the screen, or click on APPLY button 304 to store the definition and proceed to define another Customer Priority Attribute object.

A Priority Attribute object is generally a concept that relates to customers (in which case it is a Customer Priority Attribute object) or calls (Call Priority Attribute object), and potentially has a bearing on handling of the calls, as viewed from the perspective of the call center administrator. Various Priority Attribute objects may be indicative of (1) the length of time the customer has been doing business with the company, (2) dollar amount spent within some predetermined period, (3) frequency of transactions, (4) kinds of products purchased or of services requested, (5) dollar amount owed, and (6) service level or kind of contractual relationship with the company.

Figure 4:
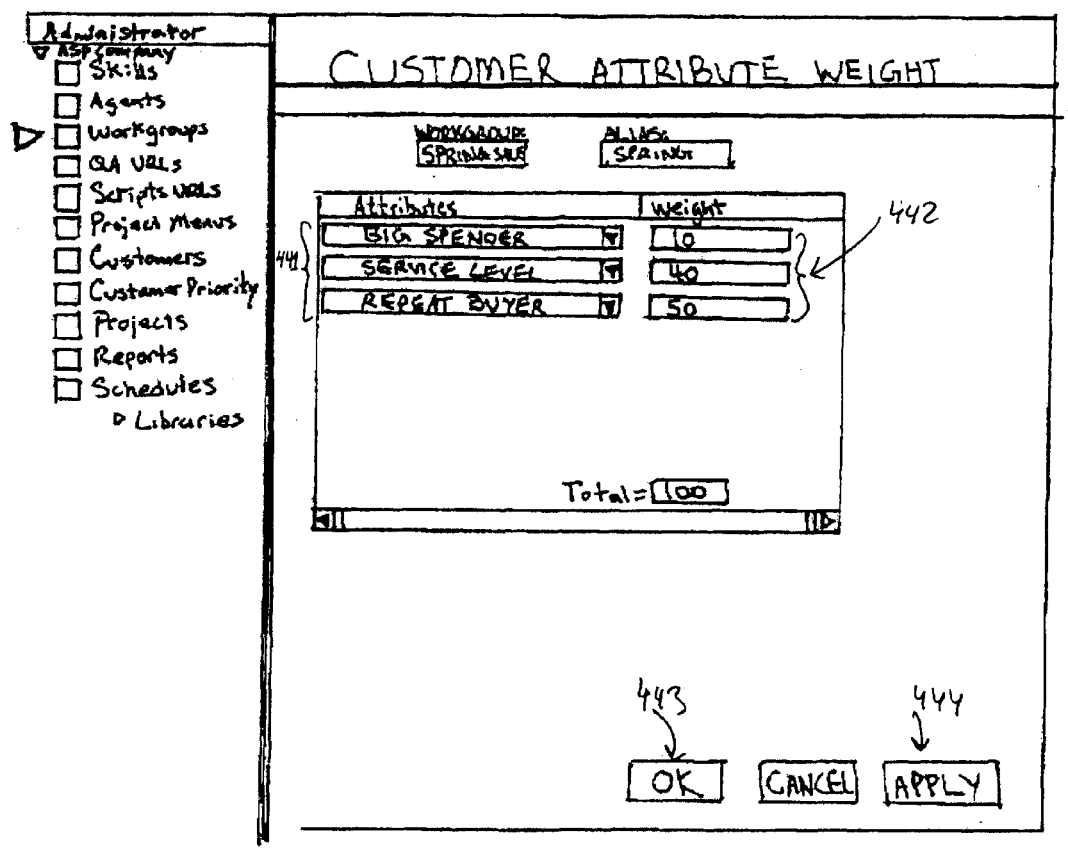
FIG. 4 illustrates representative screen output of a browser-based call center administration manager during the step of providing weights to customer priority attributes.

FIG. 4 represents screen output of a browser-based call center administration manager interface in accordance with the present invention when process the step 120—providing weights to Customer Priority Attribute objects—is being performed. To reach this screen of the embodiment under discussion, the call center administrator performs the following steps:

1. From the main left-hand column, the administrator selects the Company in which the Customer Priority Attribute object weights are to be assigned;

2. The administrator clicks on the Workgroups tab under the Company selected; and 3. The administrator right-clicks on the Workgroup to be modified, and clicks on Workgroup Customer Attribute sub-tab.

Once in the Customer Attribute Weight screen of FIG. 4, the call center administrator selects the previously defined Customer Priority Attribute objects from drop-down boxes 441 and provides relative weights for the selected Customer Priority Attribute object in list boxes 442. Then, the relative weights are saved by clicking on either OK button 443 or APPLY button 444. Note that this arrangement allows a Customer Priority Attribute object to have different weights in different workgroups, and that the total of all the weights in a particular workgroup need not add up to 100.

If default values have been provided for the relative weights, process the step 120 need not be performed.

Figure 5:
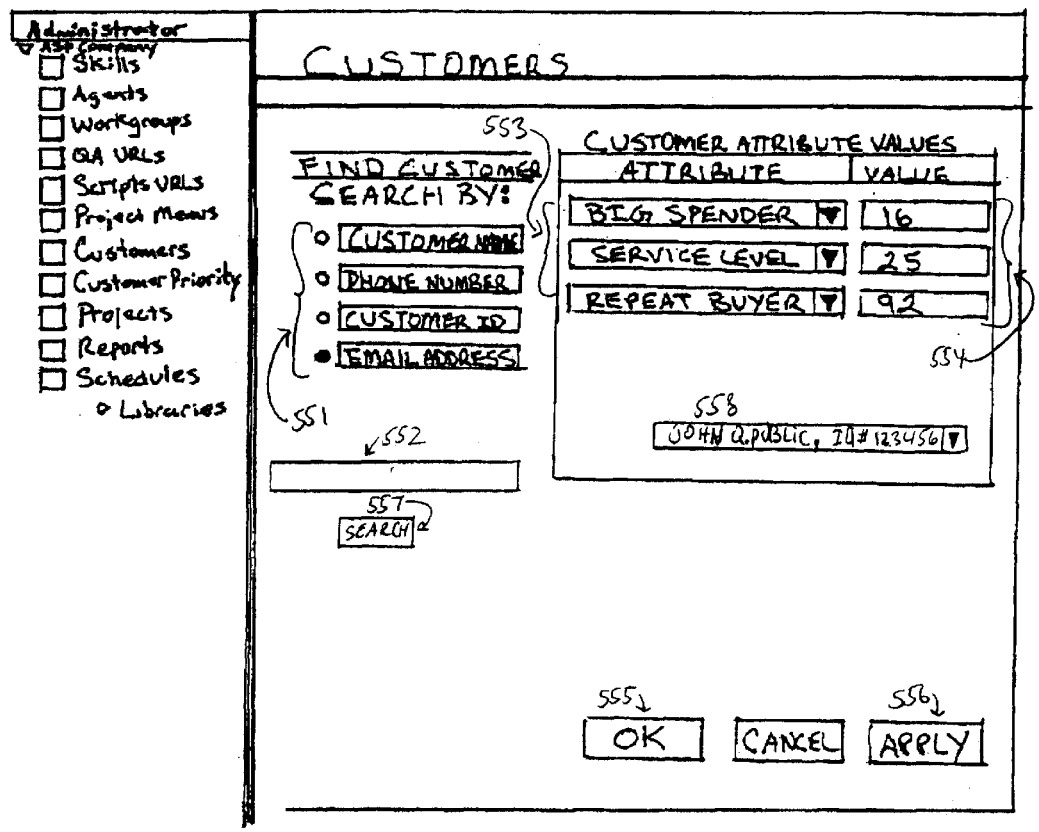
FIG. 5 illustrates representative screen output of a browser-based call center administration manager during the step of assigning initial customer-specific values to the customer priority attributes.

FIG. 5 represents screen output of a browser-based call center administration manager interface in accordance with the present invention when customer-specific values are being assigned to the Customer Priority Attribute objects; this corresponds to the process step 130. To reach the screen of FIG. 4, the call center administrator right-clicks from within the Customers tab. When the screen of FIG. 5 is displayed, the administrator selects an appropriate "Find Customer" radio button 551, instructing the administration manager to search for customers by, e.g., name, telephone number, customer ID, or email address; types the search string in the box 552; and clicks on SEARCH button 557. In response to the search command, the interface interacts with the call center's database and searches for the matching customer record(s); the matching records appear in drop-box 558, with their corresponding current Customer Priority Attribute values displayed in boxes 554; Customer Priority Attribute object names appear in boxes 553.

After a specific customer is identified, new values of the customer's various Priority Attributes can be assigned or changed in the boxes 554, and then stored by clicking on OK button 555 or APPLY button 556.

The customer attribute values can be static, i.e., remain constant or be manually updated, by performing the process step 130. In lieu of the static scheme, the embodiment being described links the customer attribute values to the call center's live database. (By live database we mean a database where values change with time in response to internal or external events or conditions.) The link allows the customer attribute values to be updated when changes made to the database. The link is dynamic, in real time. By way of an example, a customer's priority may be increased within a short time after the customer places a large order, or after the customer upgrades his or her service level.

In a variation of the dynamic linking scheme, periodic non-real-time updating can be used.

Linking of the customer attribute values to the call center's live database is achieved by using the "views" methodology. FIG. 6 shows a representation of an Oracle or SQL server table that is automatically generated by the prioritization rules-based creator portion of the administration manager. (All names and numbers used in FIG. 6 are fictional.) This table can be mapped to the live database of the call center as a "view." Once the view has been established, the native Oracle or SQL "view/field mapping" tool can be used by the administrator to associate each field in the customer attribute "view" with a field in the live database. From that point, the fields representing Customer Priority Attribute values are dynamically updated. Note that the linking of the customer priority attribute values to the call center's live database may eliminate the need to assign the customer priority attribute values initially, i.e., the need to perform the process step 130.

The views methodology, which is known to persons skilled in the art, is a common way of associating data from tables with a database without programming and without necessarily writing customer queries. Views, defined in database language SQL (Structured Query Language), are structures that provide a means for naming queries. In particular, views are table expressions that specify tables, i.e., the table expressions have values that are derived from other tables. The SQL standard has been established by American National Standards Institute (ANSI) and International Standards Organization (ISO), industry standards governing bodies. For more information on SQL see, generally, Information Technology—Database Languages—SQL (ISO/IEC 9075). SQL is supported by most commercial database management systems.

The rules-based creator being discussed employs a Customer Priority Scoring Engine algorithm that, as one of its functions, normalizes a customer's priority attribute values for each Priority Attribute based on other customers' priority attribute values for the Priority Attribute. In one variation, the maximum customer priority attribute value for each Priority Attribute is found by examining customer priority attribute values of all the customers, and each customer priority attribute value for that Priority Attribute is normalized so that the normalized maximum customer priority attribute value is 100. Expressed symbolically, this normalization algorithm becomes:

$$NCAV_{ij} = CAV_{ij} \times F_i \qquad (I)$$

and $$F_i = \frac{100}{CAV_{i,j\max}}, \qquad (II)$$

where:

(1) $CAV_{ij}$ is the customer priority attribute value of jth customer for ith Priority Attribute;

(2) $NCAV_{ij}$ is the normalized customer priority attribute value of jth customer for ith Priority Attribute;

(3) $CAV_{ijmax}$ is the maximum customer attribute value for ith Priority Attribute across all customers; and (4) $F_i$ is the normalizing factor for ith Priority Attribute.

Many other normalization algorithms can be used. In addition, the metrics (or parameters) underlying a particular Priority Attribute can be pre-processed before the actual customer priority attribute values are assigned (in the process step 130) or computed (when the customer priority attribute values are transferred from the linked live database). For example, if the first Priority Attribute is associated with the "total amount spent in the last six months" metric, the corresponding $NCAV_{ij}$ may be equal to the logarithm of the actual amount spent in the last six months, with the normalization algorithm of formulas (I) and (II) applied as before.

The above discussion does not limit either the type or the granularity of the customer priority attribute values and of their underlying metrics. A Priority Attribute may be a have a range of values associated with it, or it may have only a few discrete values. For example, a Priority Attribute equal to the "total amount spent in the last six months" metric illustrates the type of Priority Attribute with a range of values; a Priority Attribute that has a value of "100" for a customer who has spent over $10,000 in the last six months (big spender), and a value of "0" otherwise (miser) illustrates a binary Priority Attribute.

We now turn to the algorithms that prioritize calls based on the customer priority attribute values. One way to determine a call's priority is to sum all products of the customer priority attribute values with the weights of their respective Priority Attributes, which were assigned during the process step 120. Thus, a customer priority attribute-based rating $P_j$ of a call from customer j can be determined as follows:

$$P_j = \sum_k W_k \times NCAV_{kj}, \qquad (III)$$

where $NCAV_{kj}$ is the normalized customer attribute value of jth customer for kth Priority Attribute, and k ranges across all Priority Attributes. The pending calls are then queued in order of their customer priority attribute-based ratings; e.g., a call with a higher customer attribute-based priority rating is placed ahead of a call with a lower customer attribute-based priority rating.

More generally, customer attributes can become call attributes, and $P_j$ can become a call priority attribute-based rating. This allows different calls from the same customer to be treated differently. For example, a cell phone call may be given a higher priority than a call from a conventional telephone (or vice versa); and a chat with a customer using a computer connected by a conventional telephone line may be given higher priority than a chat from a customer with a fat pipe (or vice versa).

Queuing in accordance with customer (or call) priority attribute-based ratings does not preclude contemporaneous queuing in accordance with other parameters affecting call queuing, e.g., skills of available agents. For example, customer (or call) attribute-based priority rating of a call may be combined with the other parameters to result in the final call queue for a particular agent.

Many variations on this simple prioritizing algorithm are possible. For example, the maximum value of each $W_k \times NCAV_{kj}$ product may be limited. Other examples include using the following formulas:

$$P_j = \sum_k W_k^{NCAV_{k,j}}, \qquad (IV)$$

and $$P_j = \sum_k \text{Log}_{W_k}(NCAV_{k,j}), \qquad (V)$$

with all symbols having the same meaning as in formula (III) above. The maximum or minimum values of each $NCAV_{kj}$ term may be limited. Other formulas can also be used for prioritizing.

Figure 7:
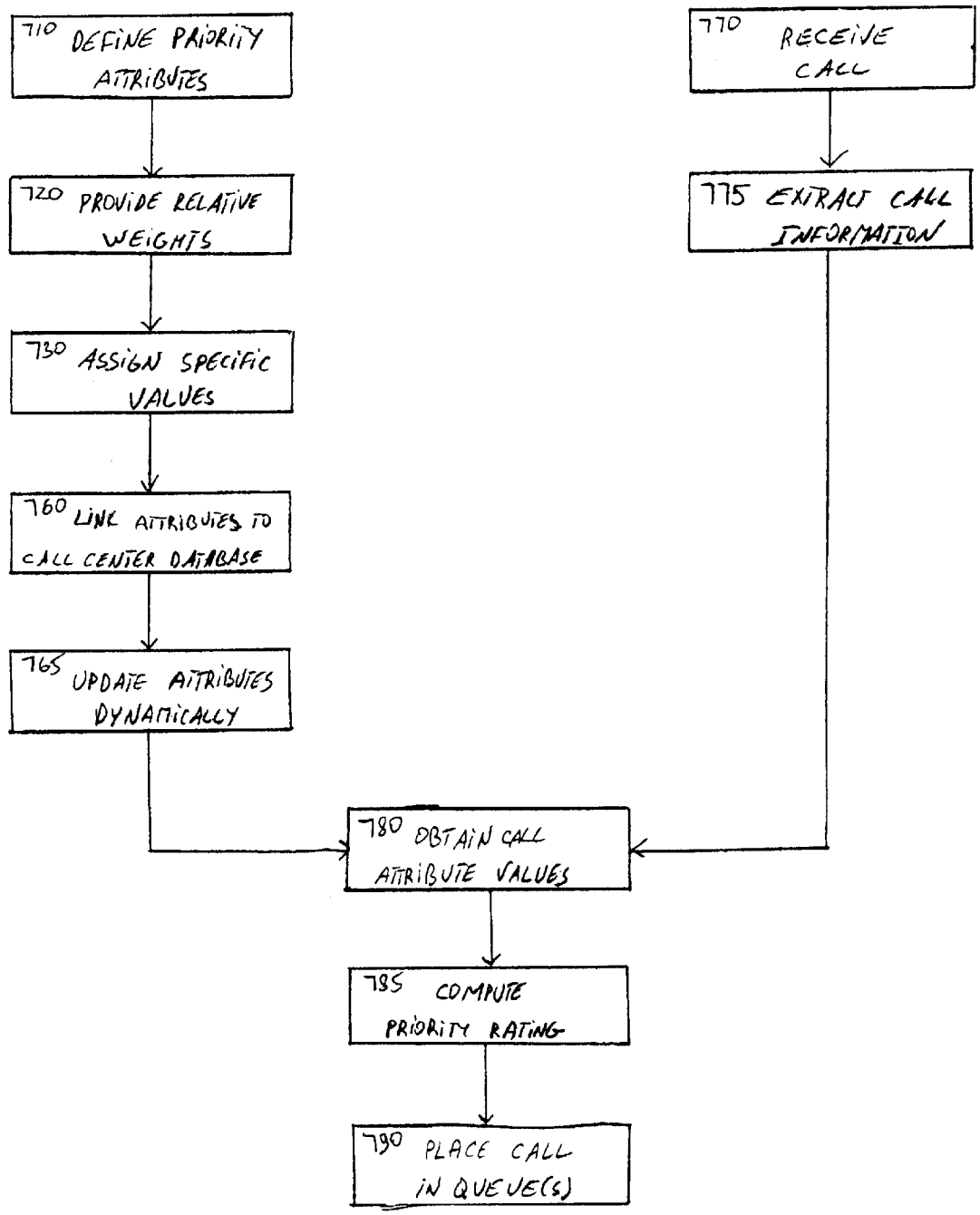
FIG. 7 illustrates a general process for prioritizing calls received by a call center.

FIG. 7 illustrates a general process for prioritizing received calls. Not all of the steps must be performed to practice the invention, and the order of the steps can be varied, unless it is otherwise indicated or a specific sequence of steps is imposed by the context.

In step 710, a call center administrator defines Attributes relevant to prioritizing the received calls (i.e., Call Priority Attributes). In step 720, the call center administrator provides relative weights to the Call Priority Attributes defined, or the relative weights are provided by a default weight assigning process. Step 730 is assignment of initial customer/call-specific values to the Call Priority Attributes by the call center administrator. Linking (e.g., mapping) of the Call Priority Attributes to the call center's database is performed in step 760, and subsequent dynamic updating of the call attribute values is represented by step 765.

A call from a customer is received by the call center in step 770. Next, the call is examined and some of the information carried by the call or supplied by the caller is extracted in step 775. The extracted information may include dialed number, provided by the Dialed Number Identification Service (DNIS), and the calling number, provided by Automatic Number Identification (ANI).

Using the extracted information, the call center accesses its database and obtains call priority attribute values for the call. This is the function of step 780. As described above, the call attribute values may include customer profile and buying history. In step 785, the call center computes the call attribute-based priority rating $P_j$ for the call. Finally, in step 790 the call is placed in one or more queues based on the priority rating ($P_j$) and other parameters affecting call queuing, e.g., skills of available agents.

As in the case of the call centers and administration managers disclosed in U.S. patent applications Ser. Nos. 09/638,274 and 09/798,226, methods and apparatuses of the present invention, or certain aspects or portions thereof, can be implemented or practiced on a computer or a plurality of computers interconnected by a network. Optionally, the methods and apparatuses of the present invention and those disclosed in U.S. patent applications Ser. Nos. 09/638,274 and 09/798,226 may be implemented or practiced within a client/server environment.

(In the client/server programming model, a server is a program that awaits and fulfills requests from client programs in the same or other computers. A given application in a computer may function as a client with requests for services from other programs, and also as a server of requests from other programs.)

Furthermore, the methods and apparatuses may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatuses of the present invention may also be embodied in the form of program code that is transmitted over some transmission medium, for example, over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

We have described the inventive call center administration manager with rules-based routing prioritization and some of its features in considerable detail for illustration purposes only. Neither the specific embodiments of the invention as a whole nor those of its features limit the general principles underlying the invention. Many additional modifications are intended in the foregoing disclosure, and it will be appreciated by those skilled in the art that in some instances some features of the invention will be employed in the absence of a corresponding use of other features. The illustrative examples therefore do not define the metes and bounds of the invention.

What is claimed is:

1. A call center capable of receiving a plurality of calls, each received call of the plurality of calls being associated with at least one priority attribute from a plurality of priority attributes, comprising:
   a plurality of agents capable of servicing the received calls of the plurality of calls;
   a database for storing information related to a customer associated with each received call, the information comprising:
      a plurality of customer priority attribute weights, each of the customer priority attribute weights being associated with a different priority attribute of the plurality of priority attributes, and
      a plurality of customer priority attribute values, each of the customer priority attribute values also associated with a priority attribute of the plurality of priority attributes; and
   an administration manager configured to determine a priority rating for each of the plurality of received calls based on one or more of the customer priority attribute values associated with each of the received calls and the customer priority attribute weights associated with each of the received calls, prioritize servicing of the plurality of received calls based on the determined priority ratings for each of the plurality of received calls, and update the plurality of customer attribute values stored in the database based on the priority attributes associated with each of the plurality of received calls.

2. A call center according to claim 1, wherein the information stored in the database further comprises names of the priority attributes.

3. A call center according to claim 1, further comprising a linking mechanism that dynamically links the customer priority attribute values entered via the interface to a live database.

4. A call center according to claim 3, wherein the live database is the database configured to store the information related to the customers associated with each of the plurality of received calls.

5. A call center according to claim 1, wherein the administration manager is further configured to update the customer priority attribute values substantially in real time.

6. A call center according to claim 4, wherein the linking mechanism links the customer priority attribute values entered via the interface using a views methodology.

7. A call center according to claim 3, wherein the defined customer priority attributes include a length of time a customer has been doing business with the call center's company.

8. A call center according to claim 3, wherein the defined customer priority attributes include a dollar amount spent within a first predetermined period by an originator of each of the received calls.

9. A call center according to claim 3, wherein the defined customer priority attributes include a frequency of transactions engaged in by a customer.

10. A call center according to claim 3, wherein the defined customer priority attributes include the kinds of products purchased and services requested by a customer.

11. A call center according to claim 3, wherein the defined customer priority attributes include an amount owed by a customer.

12. A call center according to claim 3, wherein the defined customer priority attributes include a contractual relationship associated with a customer.

13. A call center according to claim 1, further comprising an interface configured to allow customer priority attributes to be defined and information related to each defined customer priority attributes to be entered and stored in the database, wherein the information related to the customer priority attributes comprises customer priority weights and customer priority values for a plurality of customers.

14. A call center according to claim 5, further comprising an interface configured to allow customer priority attributes to be defined and information related to each defined customer priority attribute to be entered and stored in the database, wherein the information related to the customer priority attributes comprises customer priority weights.

15. A call center according to claim 14, wherein the administration manager is further configured to dynamically established the customer priority attribute values in substantially real-time after an initial call associated with certain customer is received.

16. A call center according to claim 15, wherein administration manager is further configured to subsequently update the customer priority attribute values based on priority information associated with the plurality of received calls.

17. A call center according to claim 16, wherein the interface is further configured to allow customer priority attribute values to be input or updated in non-real-time.

18. A call center according to claim 17, wherein the defined customer priority attributes include a length of time a customer has been doing business with the call center's company.

19. A call center according to claim 16, wherein the defined customer priority attributes include a dollar amount spent within a first predetermined period by an originator of each of the received calls.

20. A call center according to claim 16, wherein the defined customer priority attributes include a frequency of transactions engaged in by a customer.

21. A call center according to claim 16, wherein the defined customer priority attributes include the kinds of products purchased and services requested by a customer.

22. A call center according to claim 16, wherein the defined customer priority attributes include an amount owed by a customer.

23. A call center according to claim 16, wherein the defined customer priority attributes include a contractual relationship associated with a customer.

24. A call center according to claim 1, wherein the administration manager is further configured to prioritize the plurality of received calls based on other information.

25. A call center according to claim 24, wherein the other information includes information related to the skills or expertise of the plurality of agents.

26. A call center according to claim 1, wherein the plurality of received calls comprises facsimile transmissions.

27. A call center according to claim 1, wherein the plurality of received calls comprises email messages.

28. A call center according to claim 1, wherein the plurality of received calls comprises web based contacts.

29. A call center according to claim 1, wherein the call center is a distributed, virtual call center.

* * * * *